United States Patent

Chalasani et al.

[11] Patent Number: 5,884,138
[45] Date of Patent: Mar. 16, 1999

[54] METHOD FOR IMPROVING THE STIFFNESS OF EXTRUDATES

[75] Inventors: Devi Chalasani, Painted Post, N.Y.; Ronald E. Johnson, Tioga, Pa.; Christopher J. Malarkey, Corning, N.Y.

[73] Assignee: Corning Incorporated, Corning, N.Y.

[21] Appl. No.: 869,162

[22] Filed: Jun. 4, 1997

Related U.S. Application Data

[60] Provisional application No. 60/019,402 Jun. 10, 1996.

[51] Int. Cl.$^6$ ............................... B22F 3/20; B29C 47/00
[52] U.S. Cl. .................................. 419/2; 419/41; 419/67; 264/1.29; 264/433; 264/464
[58] Field of Search ................... 419/2, 41, 67; 264/1.29, 433, 464

[56] References Cited

U.S. PATENT DOCUMENTS

| | | | |
|---|---|---|---|
| 3,885,977 | 5/1975 | Lachman et al. | 106/62 |
| 4,740,352 | 4/1988 | Takahashi | 419/23 |
| 4,758,272 | 7/1988 | Pierotti | 75/246 |
| 4,769,212 | 9/1988 | Nakamura et al. | 419/28 |
| 4,913,737 | 4/1990 | Nakamura et al. | 75/328 |
| 4,965,039 | 10/1990 | Schuetz | 264/553 |
| 4,992,233 | 2/1991 | Swaroop et al. | 419/2 |
| 5,120,559 | 6/1992 | Rizvi et al. | 426/446 |
| 5,427,601 | 6/1995 | Harada et al. | 75/235 |
| 5,678,165 | 10/1997 | Wu | 419/37 |

OTHER PUBLICATIONS

Temperature –Enropy Diagram, Form 6244 © 1974 Liquid Carbonic.

*Primary Examiner*—Daniel J. Jenkins
*Attorney, Agent, or Firm*—L. Rita Quatrini

[57] ABSTRACT

An improvement in a method of extruding a plasticized inorganic powder mixture having a plasticizing organic binder carried in an aqueous vehicle, by passing the mixture through an extruder and then through a die to produce an extrudate. The improvement involves homogeneously blending in the extruder as part of the mixture, carbon dioxide in the supercritical and/or liquid form, to lower the viscosity of the mixture and produce an extrudate that is stiffer in a shorter time than it would be, absent the carbon dioxide, without increasing the extrusion pressure.

3 Claims, No Drawings

METHOD FOR IMPROVING THE STIFFNESS OF EXTRUDATES

This application claims the benefit of U.S. Provisional Application No. Ser. 60/019,402 filed Jun. 10, 1996, entitled METHOD FOR IMPROVING THE STIFFNESS OF EXTRUDATES, by Devi Chalasani, Ronald E. Johnson and Christopher J. Malarkey.

This invention relates to a method of producing extruded structures from highly filled inorganic powder mixtures in which supercritical and/or liquid carbon dioxide is homogeneously blended as part of the mixture in the extruder. The carbon dioxide so utilized, serves as a diluent in the mixture in the extruder reducing the viscosity of the mixture, making it softer. As the extrudate exits the die, the carbon dioxide flashes off, leaving stiff extrudate. The extrudate is stiffer than would be possible without the carbon dioxide. Moreover the increase in stiffness is accomplished without increasing the extrusion pressure.

BACKGROUND OF THE INVENTION

Powder mixtures having a cellulose ether binder are used in forming articles of various shapes. For example ceramic or metal powder mixtures are formed into honeycombs which are used as substrates in catalytic and adsorption applications. The mixtures must be well blended and homogeneous in order for the resulting shaped body to have good integrity in size and shape and uniform physical properties. The mixtures have organic additives in addition to the binders. These additives can be surfactants, lubricants, and dispersants and function as processing aids to enhance wetting thereby producing a uniform batch.

A major and ongoing need in extrusion of bodies from highly filled powder mixtures, especially multicellular bodies such as honeycombs is to extrude a stiffer body without causing higher pressures. The need is becoming increasingly critical as thinner walled cellular structures are becoming more in demand for various applications. Thin walled products with current technology are extremely difficult to handle without causing shape distortion. Rapid-setting characteristics are important for honeycomb substrates. If the cell walls of the honeycomb can be solidified quickly after forming, the dimension of the greenware will not be altered in subsequent cutting and handling steps. This is especially true for a fragile thin-walled or complex shaped product, or a product having a large frontal area.

The present invention fills the need for rapid setting of extruded bodies which is especially beneficial for thin walled honeycombs.

SUMMARY OF THE INVENTION

In accordance with one aspect of the invention, there is provided an improvement in a method of extruding a plasticized inorganic powder mixture having a plasticizing organic binder carried in an aqueous vehicle, by passing the mixture through an extruder and then through a die to produce an extrudate. The improvement involves homogeneously blending in the extruder as part of the mixture, carbon dioxide in the supercritical and/or liquid form, to lower the viscosity of the mixture and produce an extrudate that is stiffer in a shorter time than it would be, absent the carbon dioxide, without increasing the extrusion pressure.

DETAILED DESCRIPTION OF THE INVENTION

This invention relates to a method for rapid stiffening of extrudates formed from highly filled plasticized inorganic powder mixtures having a plasticizing polymeric organic binder, such as certain cellulose ethers, carried in an aqueous vehicle.

Carbon dioxide is blended in and becomes part of the extrusion mixture in the extruder. The carbon dioxide is in the form of either supercritical carbon dioxide or liquid carbon dioxide, or combinations of these forms. The environment of the mixture must be controlled under conditions of temperature and pressure suitable for maintaining the carbon dioxide in the desired form. For example, if supercritical carbon dioxide is used, the extruder must be maintained at about 88° F. and about 1100 PSIA, the critical temperature being about 87.8° F., and critical pressure being about 1066.3 PSIA. Just below this temperature and pressure, carbon dioxide exists as liquid carbon dioxide, and at even lower temperatures and pressures it exists in the solid state. The physical states of carbon dioxide at various temperatures and pressures are given in a Temperature—Entropy Diagram, Form 6244 copyright 1974, by Liquid Carbonic Industries Corporation, Chicago, Ill.

The Powder Material

Typical powders are inorganics such as metal, ceramic, glass ceramic, glass, and molecular sieve, or combinations of these.

The invention is especially suitable for use with metal powders. Metal powder mixtures generally have less vehicle than other, e.g. ceramic mixtures and the stiffening effects are therefore more pronounced than with mixtures having more vehicle.

Any sinterable metal or metal composition can be used in the practice of the present invention. Especially suited are iron group metal, chromium, and aluminum compositions, with the preferred iron group metal being iron. Especially preferred is Fe, Al, and Cr. For example, Fe5-20Al5-40Cr, and Fe7-10Al10-20Cr powders with other possible additions are especially suited. Some typical compositions of metal powders are disclosed in U.S. Pat. Nos. 4,992,233, 4,758,272, and 5,427,601 which are herein incorporated by reference as filed. U.S. Pat. No. 4,992,233 relates to methods of producing porous sintered bodies made from metal powder compositions of Fe and Al with optional additions of Sn, Cu, and Cr. U.S. Pat. No. 5,427,601 relates to porous sintered bodies having a composition consisting essentially of in percent by weight about 5 to about 40 chromium, about 2 to about 30 aluminum, 0 to about 5 of special metal, 0 to about 4 of rare earth oxide additive and the balance being iron group metal, and unavoidable impurities such as eg., Mn or Mo, with the preferred iron group metal being iron. When rare earth oxide is present, the special metal is at least one of Y, lanthanides, Zr, Hf, Ti, Si, alkaline earth metal, B, Cu, and Sn. When no rare earth oxide is present, the special metal is at least one of Y, lanthanides, Zr, Hf, Ti, Si, and B, with optional additions of alkaline earths, Cu, and Sn.

In general the metal and/or metal alloy powders and optionally rare earth oxide powders are mixed in amounts to result in the body having the desired composition. The starting metal powders are iron, cobalt, nickel, chromium, aluminum metals, and special metal powders, if they are to be used. The metal can be supplied in either the unalloyed form or alloyed with one or more of the other metals, or partially unalloyed and partially alloyed. Most typically, however, the iron, when added as the balance, is in the elemental form. The chromium can be elemental or alloyed with aluminum or iron. Chromium-aluminum alloy is preferable. Typically, the aluminum is supplied alloyed with iron and/or chromium for stability. Some typical alloy powders that can be used in formulating the mix to yield a body having some typical compositions of the present invention are Fe—Cr—Al—(Y, lanthanide series elements, Zr, Hf, or Cu) alloy powder, Cr—A—(Y, lanthanide series elements, Zr, Hf, or Cu) alloy powder, Fe—B, Fe—Si powder, etc.

In general, the powder material is fine powder (in contrast to coarse grained materials) some components of which can either impart plasticity, such as clays, when mixed with a vehicle such as water, or which when combined with the organic binder can contribute to plasticity.

By ceramic, glass ceramic and glass ceramic powders is meant those materials as well as their pre-fired precursors. By combinations is meant physical or chemical combinations, eg., mixtures or composites. Examples of these powder materials are cordierite, mullite, clay, talc, zircon, zirconia, spinel, aluminas and their precursors, silicas and their precursors, silicates, aluminates, lithium aluminosilicates, alumina silica, feldspar, titania, fused silica, nitrides, carbides, borides, eg., silicon carbide, silicon nitride, soda lime, aluminosilicate, borosilicate, soda barium borosilicate or mixtures of these, as well as others.

Especially suited are ceramic materials, such as those that yield cordierite, mullite, or mixtures of these on firing, some examples of such mixtures being, for example, about 55% to about 60% mullite, and about 30% to about 45% cordierite, with allowance for other phases, typically up to about 10% by weight. Some ceramic batch material compositions for forming cordierite that are especially suited to the practice of the present invention are those disclosed in U.S. Pat. No. 3,885,977 which is herein incorporated by reference as filed.

In accordance with a preferred embodiment, one composition which ultimately forms cordierite upon firing is as follows in percent by weight, although it is to be understood that the invention is not limited to such: about 33 to about 41, and most preferably about 34 to about 40 of aluminum oxide, about 46 to about 53 and most preferably about 48 to about 52 of silica, and about 11 to about 17 and most preferably about 12 to about 16 magnesium oxide.

The powders can be synthetically produced materials such as oxides, hydroxides, etc, or they can be naturally occurring minerals such as clays, talcs, or any combination of these. The invention is not limited to the types of powders or raw materials. These can be chosen depending on the properties desired in the body.

Some typical kinds of powder materials are given below. The particle size is given as median particle diameter by Sedigraph analysis, and the surface area is given as $N_2$ BET surface area.

Some types of clay are non-delaminated kaolinite raw clay, having a particle size of about 7–9 micrometers, and a surface area of about 5–7 $m^2/g$, such as Hydrite MP™, those having a particle size of about 2–5 micrometers, and a surface area of about 10–14 $m^2/g$, such as Hydrite PX™, delaminated kaolinite having a particle size of about 1–3 micrometers, and a surface area of about 13–17 $m^2/g$, such as KAOPAQUE-10™ (K10), calcined clay, having a particle size of about 1–3 micrometers, and a surface area of about 6–8 $m^2/g$, such as Glomax LL. All of the above named materials are sold by Dry Branch Kaolin, Dry Branch, Ga.

Some typical kinds of talc are those having a surface area of about 5–8 $m^2/g$, such as supplied by Barretts Minerals, under the designation MB 96–67.

Some typical aluminas are coarse aluminas, for example, Alcan C-700 series, such as those having a particle size of about 4–6 micrometers, and a surface area of about 0.5–1 $m^2/g$, eg., C-701™, fine alumina having a particle size of about 0.5–2 micrometers, and a surface area of about 8–11 $m^2/g$, such as A-16SG from Alcoa.

One typical kind of silica is that having a particle size of about 9–11 micrometers, and a surface area of about 4–6 $m^2/g$, such as IMSIL™ sold by Unimin Corporation.

In filter applications, such as in diesel particulate filters, it is customary to include a burnout agent in the mixture in an amount effective to obtain the porosity required for efficient filtering. A burnout agent is any particulate substance (not a binder) that burns out of the green body in the firing step. Some types of burnout agents that can be used, although it is to be understood that the invention is not limited to these, are non-waxy organics that are solid at room temperature, elemental carbon, and combinations of these. Some examples are graphite, cellulose, flour, etc. Elemental particulate carbon is preferred. Graphite is especially preferred because it has the least adverse effect on the processing. In an extrusion process, for example, the rheology of the mixture is good when graphite is used. Typically, the amount of graphite is about 10% to about 30%, and more typically about 15% to about 30% by weight based on the powder material.

Molecular sieves are crystalline substances having pores of size suitable for adsorbing molecules. The molecular sieve can be in the crystallized form or in the ammonium form or hydrogen form, or ion-exchanged with or impregnated with a cation. The molecular sieves can be provided in ion exchanged form or impregnated with cations either before forming into a body or after the product body has formed. The ion-exchange and impregnation methods are well known processes. Such treatments are within the scope of this invention.

Some types of molecular sieves which are preferred for the practice of the present invention are carbon molecular sieves, zeolites, metallophosphates, silicoaluminophosphates, and combinations of these. Carbon molecular sieves have well defined micropores made out of carbon material.

The molecular sieves that are especially suited to the invention are the zeolites. Some suitable zeolites are pentasil, such as ZSM-5, Y, such as ultrastable Y, beta, mordenite, X, such as 13X, or mixtures thereof.

The invention is also suited for mixtures that contain activated carbon or carbon precursors, e.g. thermosetting resins, that can be later activated.

The weight percents of the organic binder and vehicle are calculated as superadditions with respect to the non-organic solids by the following formula:

$$\frac{\text{weight of binder, vehicle, or other additives}}{\text{weight units of non-organic solids}} \times 100$$

The Organic Binder

The organic binder contributes to the plasticity of the mixture for shaping into a body. The plasticizing organic binder according to the present invention refers to cellulose ether binders. Some typical organic binders according to the present invention are methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, and mixtures thereof. Methylcellulose and/or methylcellulose derivatives are especially suited as organic binders in the practice of the present invention with methylcellulose, hydroxypropyl methylcellulose, or combinations of these being preferred. Preferred sources of cellulose ethers are Methocel A4M, F4M, F240, and K75M from Dow Chemical Co. Methocel A4M is a methylcellulose binder having a thermal gel point of about 50° C., and a gel strength of 5000 g/cm$^2$ (based on a 2% solution at 65° C.). Methocel F4M, F240, and K75M are hydroxypropyl methylcellulose. Methocels F4M and F240 have thermal gel points of about 54° C. Methocel K75M has a gel point of about 70° C. (all based on a 2% solution in water).

The organic binder makes up typically about 2–12% by weight, and more typically about 2–4% by weight of the mixture.

The mixture can contain other additives such as surfactants, lubricants, dispersants, or other extrusion aids, usually up to about 4% by weight, typically about 1% to 4% by weight of the mixture.

The aqueous vehicle content, which is typically water, can vary depending on the type of materials to impart optimum handling properties and compatibility with other components in the mixture. The vehicle content is less than it would be if the carbon dioxide were not used. For example, with water as a vehicle, the amount of water can be reduced by as much as 15%. As a typical example, and it is to be understood that the present invention is not limited to these values, a water content of typically about 29% to about 32% by weight without the $CO_2$ addition would be reduced to about 27% to 28% by weight or lower if feasible.

The mixtures are highly filled. By highly filled mixtures is meant a high solid to liquid content in the mixture. For example, the powder material content in the mixture is typically at least about 45% by volume, and most typically at least about 55% by volume.

The extruder must be one in which the mixture components can be uniformly blended with the carbon dioxide. Thus two stage de-airing single auger extruder, or a twin screw mixer with a die assembly attached to the discharge end are suitable. In the latter, the proper screw elements are chosen according to material and other process conditions in order to build up sufficient pressure to force the batch material through the die. Extrusion temperatures typically range from room temperature to no higher than about 60° C.

The carbon dioxide can be introduced into the extruder in any form that is easy to handle. For example, dry ice can be introduced into the extruder. However, the mixture in the extruder must be maintained in the pressure and temperature range where supercritical and/or liquid carbon dioxide exists so that any carbon dioxide in the extruder regardless of how it was introduced, will convert to and be maintained as supercritical and/or liquid carbon dioxide. Supercritical and/or liquid carbon dioxide serves as a diluent to reduce viscosity to make a softer batch, resulting in lower extrusion pressures than would be possible for a similar batch without those forms of carbon dioxide. Softer mixtures of inorganic powders which can be abrasive, extend the life of the extrusion die, even with the more abrasive powders. Also, because the addition of carbon dioxide enables less water to be used, the drying time is reduced from what would be needed without the $CO_2$ for a given system. At the same time there is a sharp increase in stiffness of the extrudate upon exiting the extrusion die due to the reduction in pressure as the carbon dioxide flashes off the extrudate passes from the extruder environment to ambient atmosphere. The resultant expansion of the carbon dioxide at this point can be controlled by venting at the die exit so as not to cause deformation of the extrudate due to too rapid release of gaseous carbon dioxide.

The bodies according to the present invention can have any convenient size and shape and the invention is applicable to all processes in which powder mixtures having a cellulose ether binder are extruded and to the products made therefrom. However, the process is especially suited to production of cellular monolith bodies such as honeycombs. Cellular bodies find use in a number of applications such as catalyst carriers, electrically heated catalysts, filters such as diesel particulate filters, molten metal filters, regenerator cores, etc.

Some examples of honeycombs produced by the process of the present invention, although it is to be understood that the invention is not limited to such, are those having about 94 cells/cm$^2$ (about 600 cells/in$^2$), about 62 cells/cm$^2$ (about 400 cells/in$^2$), or about 47 cells/cm$^2$ (about 300 cells/in$^2$), those having about 31 cells/cm$^2$ (about 200 cells/in$^2$), or those having about 15 cells/cm$^2$ (about 100 cells/in$^2$). Typical wall thicknesses are for example, about 0.15 mm (about 6 mils) for about 62 cells/cm$^2$ (about 400 cells/in$^2$) honeycombs. Wall (web) thicknesses range typically from about 0.1 to about 0.6 mm (about 4 to about 25 mils). The external size and shape of the body is controlled by the application, e.g. in automotive applications by engine size and space available for mounting, etc. Honeycombs having about 15 to about 30 cells/cm$^2$ (about 100 to about 200 cells/in$^2$) and about 0.30 to about 0.64 mm (about 12 to about 25 mil) wall thicknesses are especially suited for diesel particulate filter applications. This invention is especially advantageous for honeycombs having very thin walls, e.g. $\leq 0.13$ mm (5 mils).

The extrudates can then be dried and fired according to known techniques except that drying times will be shorter due to less water in the extrudate.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. In a method of extruding a plasticized inorganic powder mixture having a plasticizing organic binder carried in an aqueous vehicle, by passing the mixture through an extruder and then through a die to produce an extrudate, the improvement comprising homogeneously blending in the extruder as part of the mixture, carbon dioxide selected from the group consisting of supercritical carbon dioxide, liquid carbon dioxide and combinations thereof, to lower the viscosity of the mixture and produce an extrudate that is stiffer in a shorter time than it would be, absent the carbon dioxide, without increasing the extrusion pressure.

2. The improvement of claim 1 wherein the powder is selected from the group consisting of metal, ceramic, glass, glass-ceramic, molecular sieve, and combinations thereof.

3. The improvement of claim 2 wherein the mixture is extruded into a honeycomb structure.

* * * * *